United States Patent Office 3,833,611
Patented Sept. 3, 1974

3,833,611
3,7-METHANO-BENZOXONIN COMPOUNDS
Raphael Mechoulam, Jerusalem, and Shlomo Houry, Ramat-Gan, Israel, and Bernard Loev, Broomall, Pa., assignors to Yissum Research Development Company, Jerusalem, Israel, and Smithkline Corporation, Philadelphia, Pa.
No Drawing. Filed Apr. 5, 1973, Ser. No. 348,423
Int. Cl. C07d 9/00
U.S. Cl. 260—333                 3 Claims

ABSTRACT OF THE DISCLOSURE

The compounds are 3,7-methano-benzoxonins having pharmacological activity such as central nervous system activity.

This invention relates to new 3,7-methanobenzoxonin compounds having pharmacological activity.

The compounds of this invention are represented by the following formula:

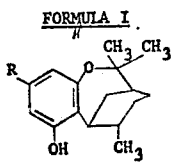

FORMULA I in which R is straight or branched alkyl having 5 to 12 carbon atoms.

Preferred compounds of this invention are represented by Formula I in which R is 1,2-dimethylheptyl or pentyl.

The compounds of Formula I may exist as stereoisomers. The C-6 methyl group in the oxonin ring may have the axial or equatorial configuration. Also, the compounds may exist as optical isomers due to asymmetry of carbon atoms. The formulas presented herein are intended to include all of the isomers, including separated isomers and mixtures thereof.

The compounds of this invention are prepared by the following procedures:

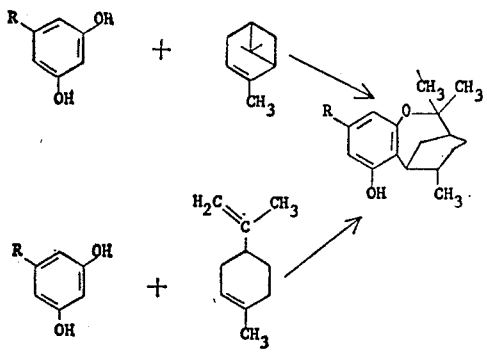

The term R is as defined above.

According to the above procedure, α-pinene or limonene is reacted with a 5-alkylresorcinol in the presence of a strong acid such as phosphorus oxychloride, sulfuric acid or hydrochloric acid. The 3,7-methanobenzoxonin is isolated by chromatography, for example by chromatographing on silica gel using ether-petroleum ether as eluant.

The compounds of this invention have pharmacological activity such as central nervous system activity, for example the compounds have central nervous system depressant, sedative and tranquilizing activity. In addition, the compounds may have analgesic, hypotensive, anticonvulsive and antimigraine activity.

The central nervous system activity is demonstrated by oral administration to rats at doses of about 10 to about 50 mg./kg. to produce effects such as decreased spontaneous motor activity.

One skilled in the art will recognize that in determining the amounts of the compound to produce the desired pharmacological effect, the activity of the compound as well as the size of the host animal must be considered.

The compounds of this invention may be combined with standard pharmaceutical carriers and administered internally in conventional dosage forms such a capsules, tablets or liquid preparations.

The following examples are not limiting but illustrative of the compounds of this invention and processes for their preparation.

EXAMPLE 1

α-Pinene (0.7 g.) and 0.9 g. of olivetol (5-pentylresorcinol) are dissolved in 5 ml. of benzene. Phosphorus oxychloride (0.3 g.) is added and the solution is boiled for two hours. The cooled solution is neutralized with aqueous sodium bicarbonate solution (50 ml.) and extracted with ether. The ether solution is chromatographed over silica gel (75 g.). Elution with petroleum ether containing 5–10% ether gives 2,3,4,5,6,7 - hexahydro-8 - hydroxy-2,2-dimethyl-6-methyl-10-pentyl-3,7-methano-1 - benzoxonin. Further purification is carried out by thin layer chromatography.

The dinitrobenzoate ester, prepared by reacting 2,3,4,-5,6,7 - hexahydro-8-hydroxy-2,2 - dimethyl-6 - methyl-10-pentyl-3,7-methano - 1 - benzoxonin with dinitrobenzoic acid by standard procedures, melts at 98–100° C.

EXAMPLE 2

Using limonene in place of α-pinene in the procedure of Example 1, 2,3,4,5,6,7-hexahydro-8-hydroxy-2,2-dimethyl-6-methyl-10-pentyl-3,7-methano-1-benzoxonin is obtained.

EXAMPLE 3

α-Pinene (1.3 g.) and 5-(1,2-dimethylheptyl)resorcinol (2.5 g.) are dissolved in 10 ml. of benzene. Phosphorus oxychloride (0.6 ml.) is added and the solution is boiled for two hours. The solution is cooled and then neutralized with aqueous sodium bicarbonate (100 ml.) and extracted with ether. The ether solution is chromatographed over silica gel (180 g.). Elution with petroleum ether containing 5–10% ether gives 10-(1,2-dimethylheptyl)-2,3,4,5,6,-7 - hexahydro - 8 - hydroxy - 2,2 - dimethyl - 6 - methyl - 3,7-methano-1-benzoxonin.

EXAMPLE 4

Using 5-heptylresorcinol in place of 5-pentyl-resorcinol in the procedure of Example 1, the product is 10-heptyl-2,3,4,5,6,7 - hexahydro - 8 - hydroxy - 2,2 - dimethyl - 6 - methyl-3,7-methano-1-benzoxonin.

EXAMPLE 5

In the procedure of Example 3, using 5-(1,2-dimethyloctyl)resorcinol in place of 5-(1,2-dimethylheptyl)resorcinol, the product is 10-(1,2-dimethyloctyl)-2,3,4,5,6,7-hexahydro - 8 - hydroxy - 2,2 - dimethyl - 6 - methano - 1-benzoxonin.

Similarly, using the following 5-alkylresorcinols:

5-(1-2-dimethylhexyl)resorcinol
5-(1,1-dimethylheptyl)resorcinol
5-(1-ethyl-2-methylpropyl)resorcinol
5-(1-methylnonyl)resorcinol
5-(1-methyloctyl)resorcinol
5-(1,2,4-trimethylhexyl)resorcinol
5-(1-ethylheptyl)resorcinol the corresponding 10-alkyl 2,3,4,5,6,7-hexahydro-8-hydroxy - 2,2 - dimethyl - 6 - methyl - 3,7 - methano - 1 - benzoxonins are prepared.

EXAMPLE 6

3,5-Dimethoxyphenyl-α-methylacetonitrile is converted to 3,5-dimethoxy-α-methylbenzyl methyl ketone by refluxing with methyl magnesium bromide in ether, then pouring the reaction mixture onto an ice water-hydrochloric acid mixture and working up by standard procedures. This ketone is then reacted with n-octyl magnesium bromide and the resulting 1,3-dimethoxy-5-(2-hydroxy-1,2-dimethyldecyl)benzene is dehydrated and reduced and the methoxy groups are demethylated to give 5-(1,2-dimethyldecyl)resorcinol.

Using 5-(1,2-dimethyldecyl)resorcinol in place of 5-(1,2-dimethylhepty)resorcinol in the procedure of Example 3 gives 10-(1,2-dimethyldecyl)-2,3,4,5,6,7-hexahyddro-8-hydroxy - 2,2 - dimethyl - 6 - methyl - 3,7 - methano - 1 - benzoxonin.

What is claimed is:
1. A compound of the formula:

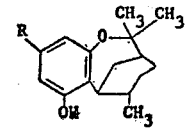

in which R is straight or branched alkyl having 5 to 12 carbon atoms.

2. A compound of claim 1 in which R is 1,2-dimethylheptyl.

3. A compound of claim 1 in which R is pentyl.

No references cited.

NORMA S. MILESTONE, Primary Examiner

U.S. Cl. X.R.

260—624 R, 590, 613 D; 424—278

PO-1050
(5/69)

UNITED STATES PATENT OFFICE
CERTIFICATE OF CORRECTION

Patent No. 3,833,611          Dated September 3, 1974

Inventor(s) Raphael Mechoulam, Shlomo Houry & Bernard Loev

It is certified that error appears in the above-identified patent and that said Letters Patent are hereby corrected as shown below:

Column 2, line 62,   "6-methano"   should read 6-methyl-3,7-methano .

Signed and sealed this 19th day of November 1974.

(SEAL)
Attest:

McCOY M. GIBSON JR.
Attesting Officer

C. MARSHALL DANN
Commissioner of Patents

Disclaimer 3,833,611.—*Raphael Mechoulam*, Jerusalem, and *Shlomo Houry*, Ramat-Gan, Israel, and *Bernard Loev*, Broomall, Pa. 3,7-METHANOBENZOXONIN COMPOUNDS. Patent dated Sept. 3, 1974. Disclaimer filed Jan. 28, 1975, by the assignee, *Yissum Research Development Company*.

Hereby enters this disclaimer to claims 1–3, inclusive, of said patent.

[*Official Gazette May 27, 1975.*]